Nov. 24, 1925.
C. A. SCHELL
1,563,231
DISK FOR FLEXIBLE COUPLINGS
Filed July 10, 1920
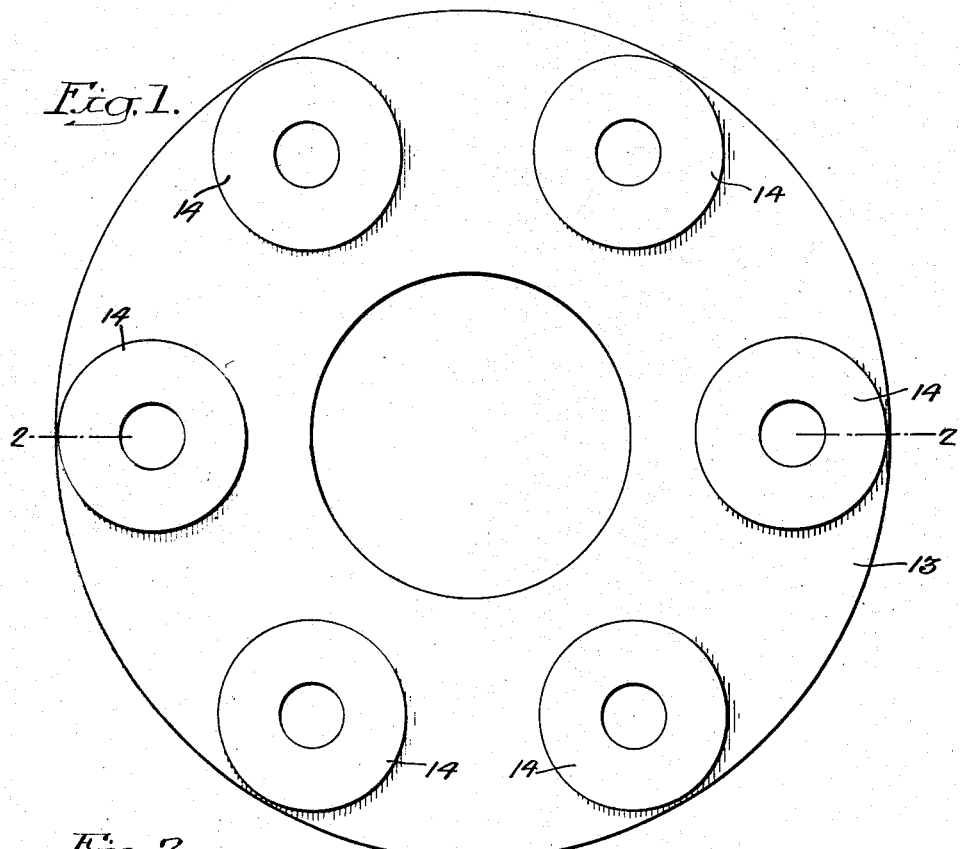
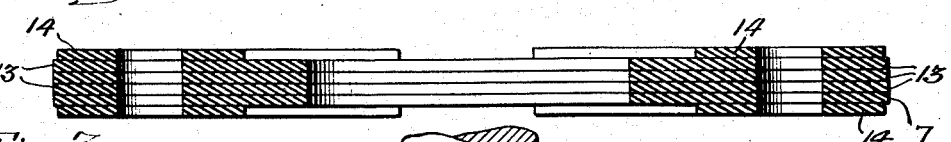
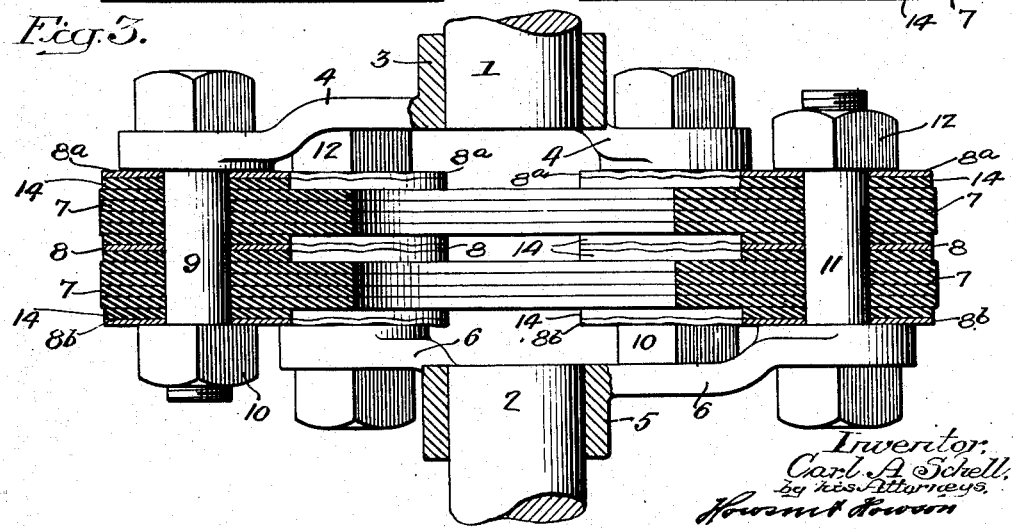

Patented Nov. 24, 1925.

1,563,231

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

DISK FOR FLEXIBLE COUPLINGS.

Application filed July 10, 1920. Serial No. 395,311.

*To all whom it may concern:*

Be it known that I, CARL A. SCHELL, a citizen of the United States, residing in Cleveland, Ohio, have invented certain Improvements in Disks for Flexible Couplings, of which the following is a specification.

My invention relates to certain improvements in laminated disks which are used in transmission couplings where a driven shaft is flexibly connected to a driving shaft. The invention is particularly adapted for use in connection with the driving elements of an automobile where flexibility is desired.

These disks are usually laminated structures built up of different layers of fabric and rubber.

The object of the invention is to reinforce these disks at the bolt holes, not only to prevent the cutting of the body of the disk by metallic washers, but also to strengthen the disks at the bolt holes where they are the weakest and to shift the point of flexure as far from the bolts as possible. It will be understood that these disks are under intense torsional strains and flexing strains, due to the quickness with which power is applied to the motor shaft.

In the accompanying drawings:

Fig. 1 is a face view of one of my improved transmission disks; Fig. 2 is a sectional view on the line 2—2, Fig. 1, and Fig. 3 is a view showing two of the disks coupled to the spider attached to the transmission shafts.

Referring to Fig. 3, 1 is a driving shaft and 2 is a driven shaft. On the driving shaft 1 is a hub 3 having arms 4 and on the shaft 2 is a hub 5 having arms 6. There are three arms on each hub, in the present instance, forming what may be termed a "spider". 7—7 are two disks spaced apart by metallic washers 8. There are metallic washers 8ª and 8ᵇ on each side of the disks, as shown. 9 are bolts having nuts 10 connecting the arms 4 with the disks 7. 11 are bolts having nuts 12 connecting the arms 6 with the disks. The disks 7 are laminated structures made of several plies 13 of fabric and rubber. These disks are made under pressure and vulcanized, which makes them pliable and of great strength. The several sheets of fabric are placed so that the warp and weft threads of one fabric are at an angle to those of another fabric. I lay no claim to this construction, but, in practice, these disks must be firmly fastened to the arms of the driving and driven hubs, and, consequently, metallic washers are used, preferably corrugated. These metallic washers cut into the body of the fabric to such an extent as to weaken it at the bolt holes.

In order to prevent the weakening of the fabric, I reinforce the fabric at the bolt holes by securing to each side of the disk at each hole a small fabric disk 14, which is also impregnated with rubber and is vulcanized with the main disk so that these reinforcements become part of the main disk. This not only prevents the cutting of the body of the disk by the washers, but also materially reinforces the disk at the bolt holes so that in the event of tearing, the tear will not be at the bolt holes, which are the weakest points. Furthermore, by reinforcing the main disks with a number of these smaller disks the moment of flexure is carried away from the bolts and nearer a line equidistant the two bolts.

If a disk be made extra thick throughout, it destroys its flexibility to a considerable extent. My improved disk will withstand the wear for a greater length of time than one made in the usual manner and will not tear at the bolt holes, and will be flexible so as to accommodate the irregular movement of the mechanism.

While I prefer to make the laminated structure of fabric, such as canvas and rubber, in which the warp and weft threads of one sheet are an angle to those of another sheet, the body of the main disks may be made in any manner desired without departing from the essential features of the invention.

I claim:

1. A transmission disk made of fabric and rubber and having a series of bolt holes therein, said disk being thickened at the bolt holes by addition of integral layers of like material, whereby the moment of flexure is carried away from the bolt holes.

2. A transmission disk made of fabric and rubber vulcanized and having a series of bolt holes; and a small disk integrally attached on each side of the main disk at the bolt holes so as to reinforce the main disk at said bolt holes.

3. A transmission disk having a central opening and a series of holes spaced apart, said disk being made of a series of plies of fabric and rubber; and a series of fabric disks mounted on each side of the main disk and surrounding each of the small holes in the main disk, the whole being vulcanized to form an integral structure.

CARL A. SCHELL.